(12) United States Patent
Lai

(10) Patent No.: US 7,811,102 B2
(45) Date of Patent: Oct. 12, 2010

(54) CONNECTING DEVICE AND ELECTRONIC DEVICE HAVING SAME

(75) Inventor: Jin-Shi Lai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/489,420

(22) Filed: Jun. 22, 2009

(65) Prior Publication Data

US 2010/0165569 A1 Jul. 1, 2010

(30) Foreign Application Priority Data

Dec. 26, 2008 (CN) .................... 2008 1 0306589

(51) Int. Cl.
*H01R 13/44* (2006.01)
(52) U.S. Cl. .................... 439/131; 361/679.55
(58) Field of Classification Search ............... 439/131, 439/142–144, 639, 650, 653, 654; 361/679.55
See application file for complete search history.

(56) References Cited

U.S. PATENT DOCUMENTS

| | | | | |
|---|---|---|---|---|
| 6,999,695 B2* | 2/2006 | Ueda | ............... | 399/90 |
| 7,066,767 B2* | 6/2006 | Liao | ............... | 439/639 |
| 7,217,144 B1* | 5/2007 | Cipolla et al. | ............... | 439/131 |
| 7,494,349 B1* | 2/2009 | Huang et al. | ............... | 439/131 |
| 7,540,748 B2* | 6/2009 | Tracy et al. | ............... | 439/131 |
| 7,679,901 B2* | 3/2010 | Lin | ............... | 361/679.43 |
| 2010/0165569 A1* | 7/2010 | Lai | ............... | 361/679.55 |

* cited by examiner

*Primary Examiner*—Ross N Gushi
(74) *Attorney, Agent, or Firm*—Frank R. Niranjan

(57) ABSTRACT

A connecting device is used in an electronic device. The electronic device includes a housing including a bottom plate, a sidewall and a pivot shaft. The sidewall extends perpendicularly from the bottom plate and defines an opening and a slot. The pivot shaft extends perpendicularly from the bottom plate and is aligned with the slot. The connecting device includes a driven gear, a main body and a driving member. The driven gear is disposed on the bottom plate, rotatably positioned by the pivot shaft, and fixed to the main body. The main body defines more than one connection port. The driving member is engaged with the driven gear and protrudes out from the slot. The driving member is operable to rotate the driven gear and the main body around the pivot shaft, thereby switches the connection ports to be exposed to the outside of the housing via the opening.

12 Claims, 8 Drawing Sheets

CONNECTING DEVICE AND ELECTRONIC DEVICE HAVING SAME

BACKGROUND

1. Technical Field

The present disclosure relates to connecting devices and, particularly, to a connecting device having more than one connection port and an electronic device having the same.

2. Description of Related Art

Electronic devices typically include a housing and define a number of connection ports, such as audio ports, video ports and universal serial bus (USB) ports, which are randomly located around the housing of the electronic devices. One of the challenges of utilizing such an electronic device is that the random location of the connection ports decrease dustproof effectiveness of the housing.

Therefore, it is desirable to provide a connecting device and an electronic device having the same which can overcome the described limitations.

DETAILED DESCRIPTION

Embodiments of the disclosure will now be described in detail with reference to the drawings.

Figure 1:
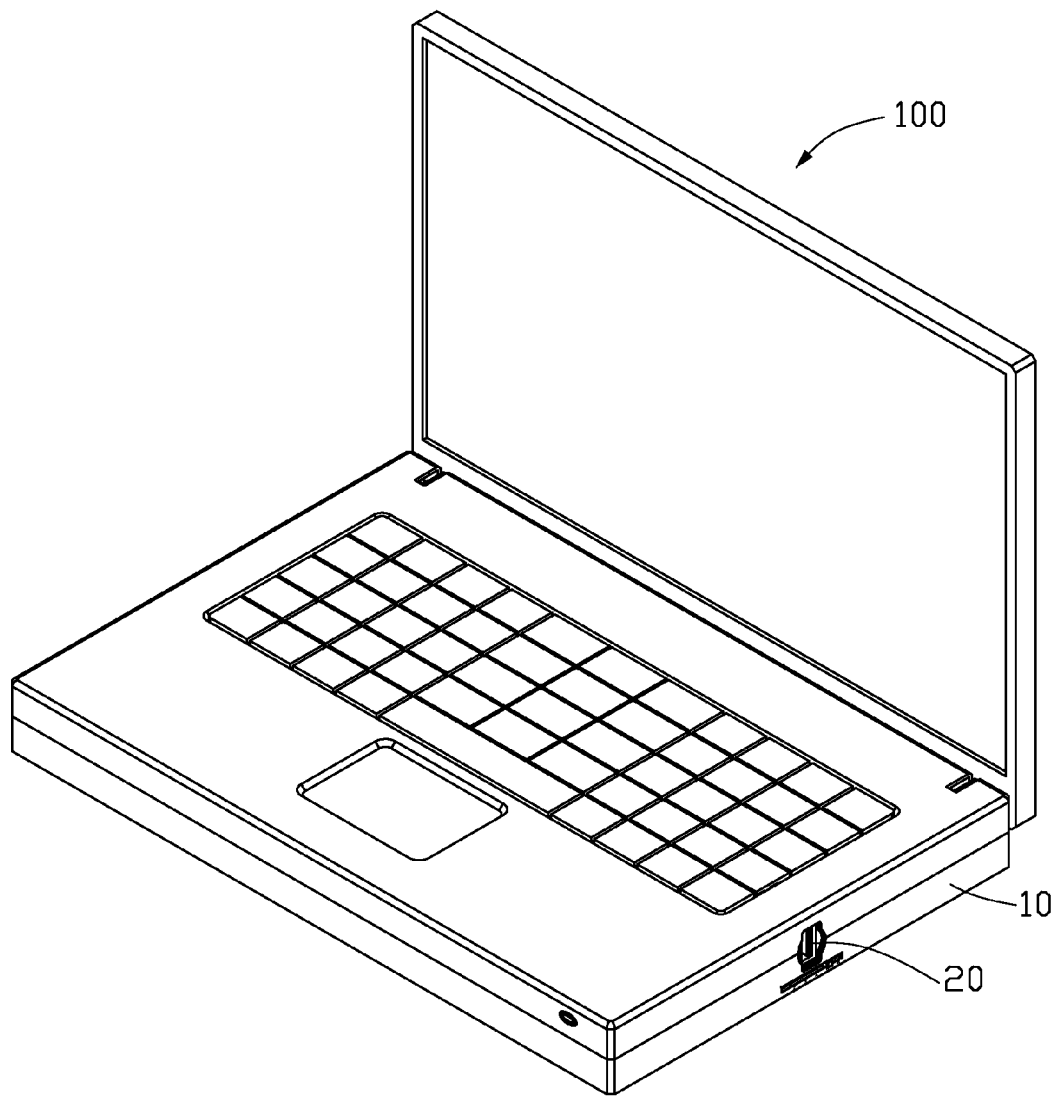
FIG. 1 is an isometric, schematic view of an electronic device according to an exemplary embodiment.

FIG. 1 shows an electronic device 100 in accordance with an exemplary embodiment. The electronic device 100 includes a housing 10 and a connecting device 20 received in the housing 10. In this embodiment, the electronic device 100 is a laptop computer.

Figure 2:
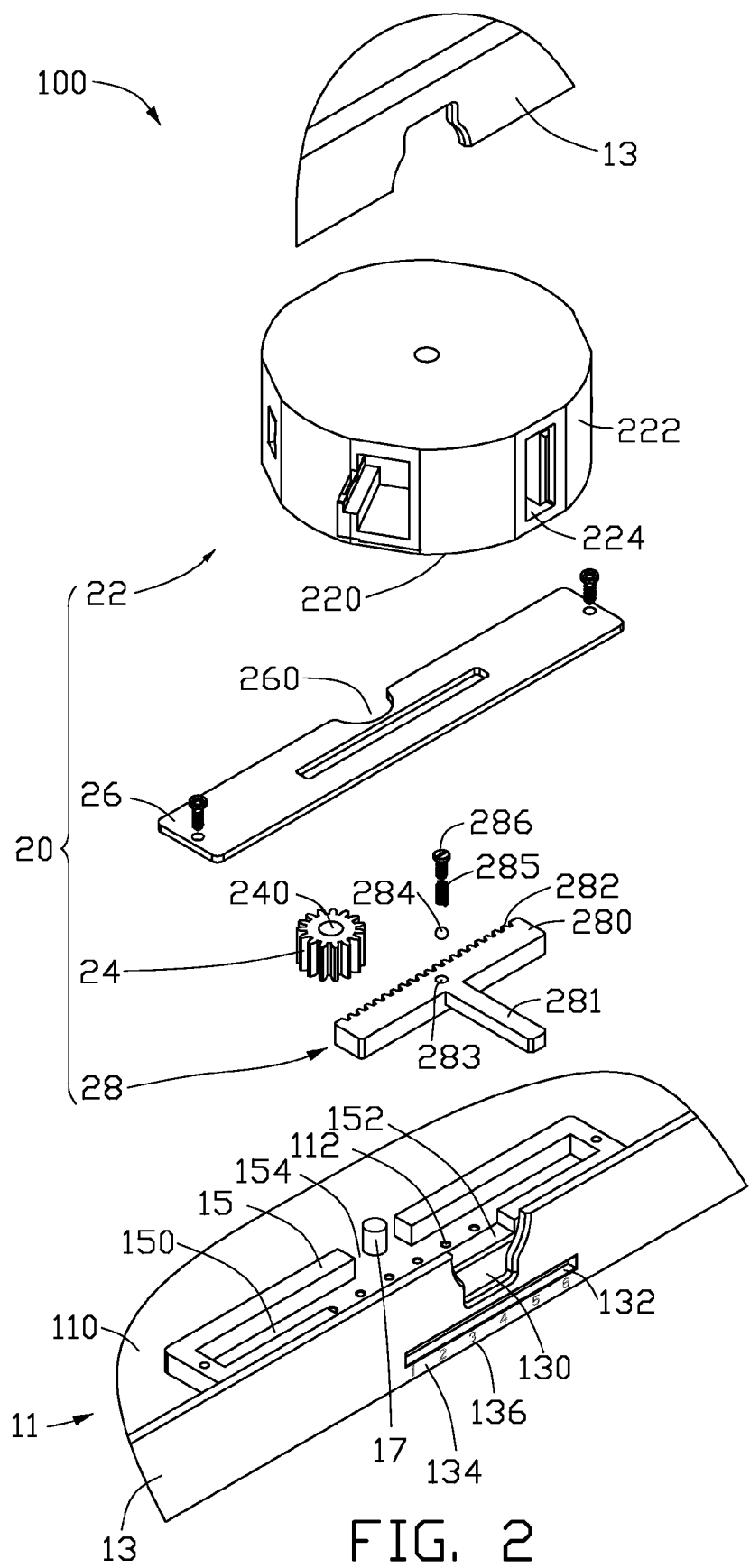
FIG. 2 is an isometric, exploded, partially sectional, schematic view of the electronic device of FIG. 1.

Referring to FIG. 2, the housing 10 includes a bottom plate 11 including an inner surface 110, a sidewall 13 substantially extending perpendicularly from the inner surface 110, and a rectangular frame 15 fixed on the inner surface 110 adjacent the sidewall 13.

The bottom plate 11 defines six positioning blind holes 112 arranged in a straight line substantially parallel to the sidewall 13. Each positioning blind hole 112 defines a spherical inner surface (not labeled).

The sidewall 13 defines an opening 130 and an elongated slot 132 beneath the opening 130, and includes a ruler-shaped indicating sheet 134 pasted immediately beneath the elongated slot 132. The length of the indicating sheet 134 is substantially parallel to that of the elongated slot 132. The indicating sheet 134 defines six labels 136 corresponding to the six positioning blind holes 112.

The frame 15 is formed by a rectangular plate via defining a sliding slot 150 in the center of the rectangular plate, a passing slot 152 generally at the middle of a longer edge of the rectangular plate, and a receiving slot 154 generally at the middle of the other longer edge of the rectangular plate. The passing slot 152 and the receiving slot 154 communicate with the sliding slot 150. The frame 15 is disposed on the inner surface 110 so that the six positioning blind holes 112 are exposed via the sliding slot 150 and the passing slot 152 is adjacent to the sidewall 13.

In addition, the housing 10 further includes a pivot shaft 17 extending substantially perpendicularly from the bottom plate 11. The pivot shaft 17 is positioned generally at the middle of the receiving slot 154 and substantially aligned with the elongated slot 132.

The connecting device 20 includes a cylindrical main body 22, a driven gear 24, a cover plate 26, and a driving member 28.

The main body 22 includes a bottom surface 220 and a cylindrical lateral surface 222 substantially perpendicular to the bottom surface 220, and defines six connection ports 224 in the lateral surface 222. The radius of the main body 22 is a little smaller than the distance between the pivot shaft 17 and the opening 130. The six connection ports 224 can be, but not limited to, an audio port, a video port, a USB port, an Institute of Electrical and Electronics Engineers (IEEE) 1394 port, a network port, and a power port. The connection ports 224 are electrically connected to inner circuitries (not shown) of the electronic device 100. In the present embodiment, the six connection ports 224 are scattered around the lateral surface 222 at uniform intervals correspondingly.

The driven gear 24 defines a central pivot hole 240. The size of the driven gear 24 is less than that of the receiving slot 154.

The cover plate 26 is rectangular, and defines a semi-circular cutout 260 at the middle of a longer edge.

The driving member 28 is a T-shape block including a driving rack 280 and a handle 281. The driving rack 280 is a strip defining a toothed edge 282. The driving rack 280 is shorter than the sliding slot 150. The handle 281 is a strip fixed to the middle of one side of the driving rack 280 opposite to the toothed edge 282. The handle 281 is substantially perpendicular to the driving rack 280. In the present embodiment, the driving member 28 further defines a through hole 283 in the middle, and includes a positioning ball 284, a spring 285, and a screw 286. The radius of the positioning ball 284 is longer than the depth of the positioning blind hole 112 but a little shorter than the radius of the through hole 283. The spring 285 is longer than the thickness of the driving rack 280 in a normal state. The outer diameter of the spring 285 is a little shorter than the diameter of the through hole 283. The inner diameter of the spring 285 is a little shorter than the diameter of the positioning ball 284.

Figure 3:
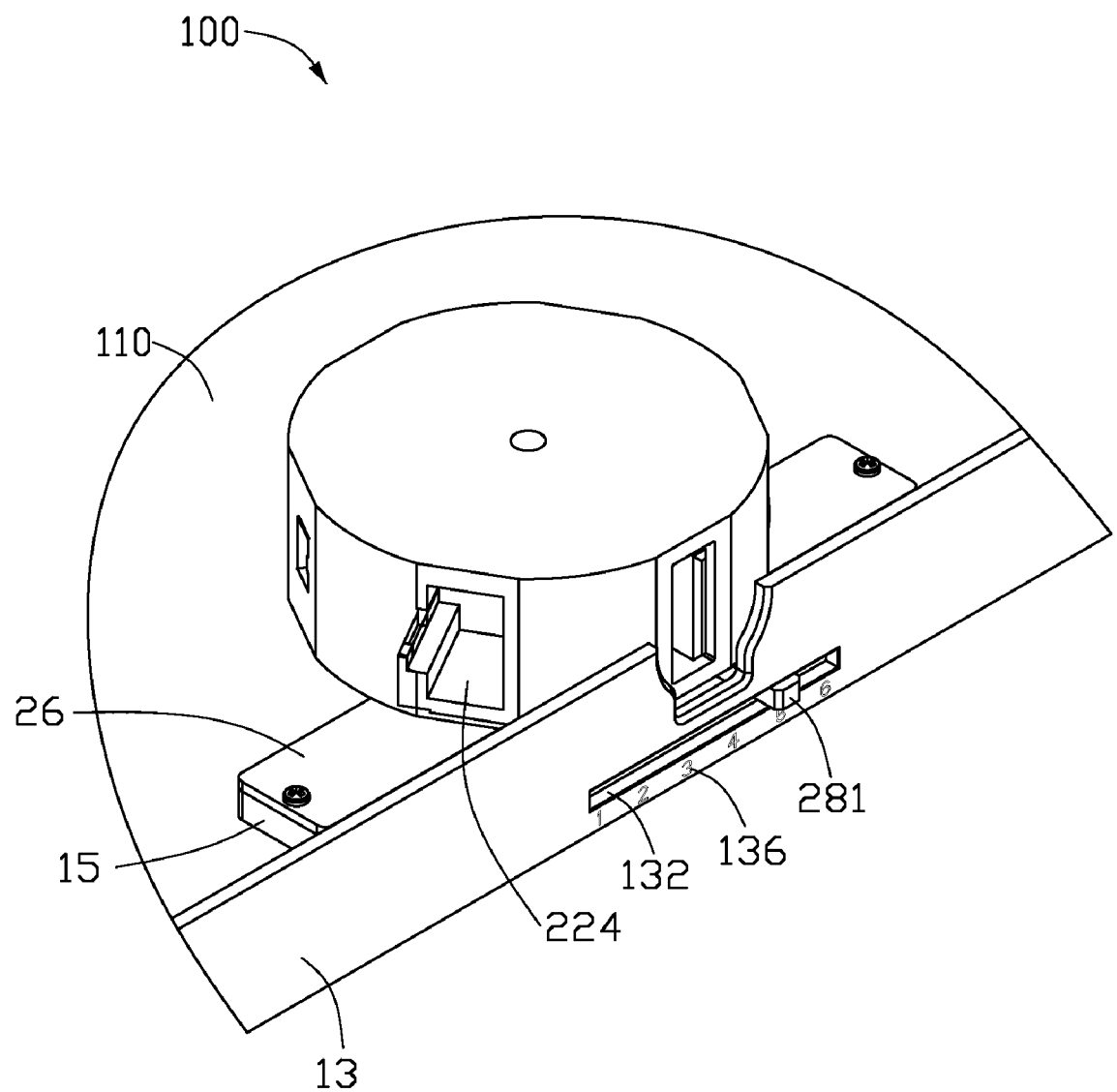
FIGS. 3 and 4 are partially assembled views of the electronic device of FIG. 2.
Figure 4:
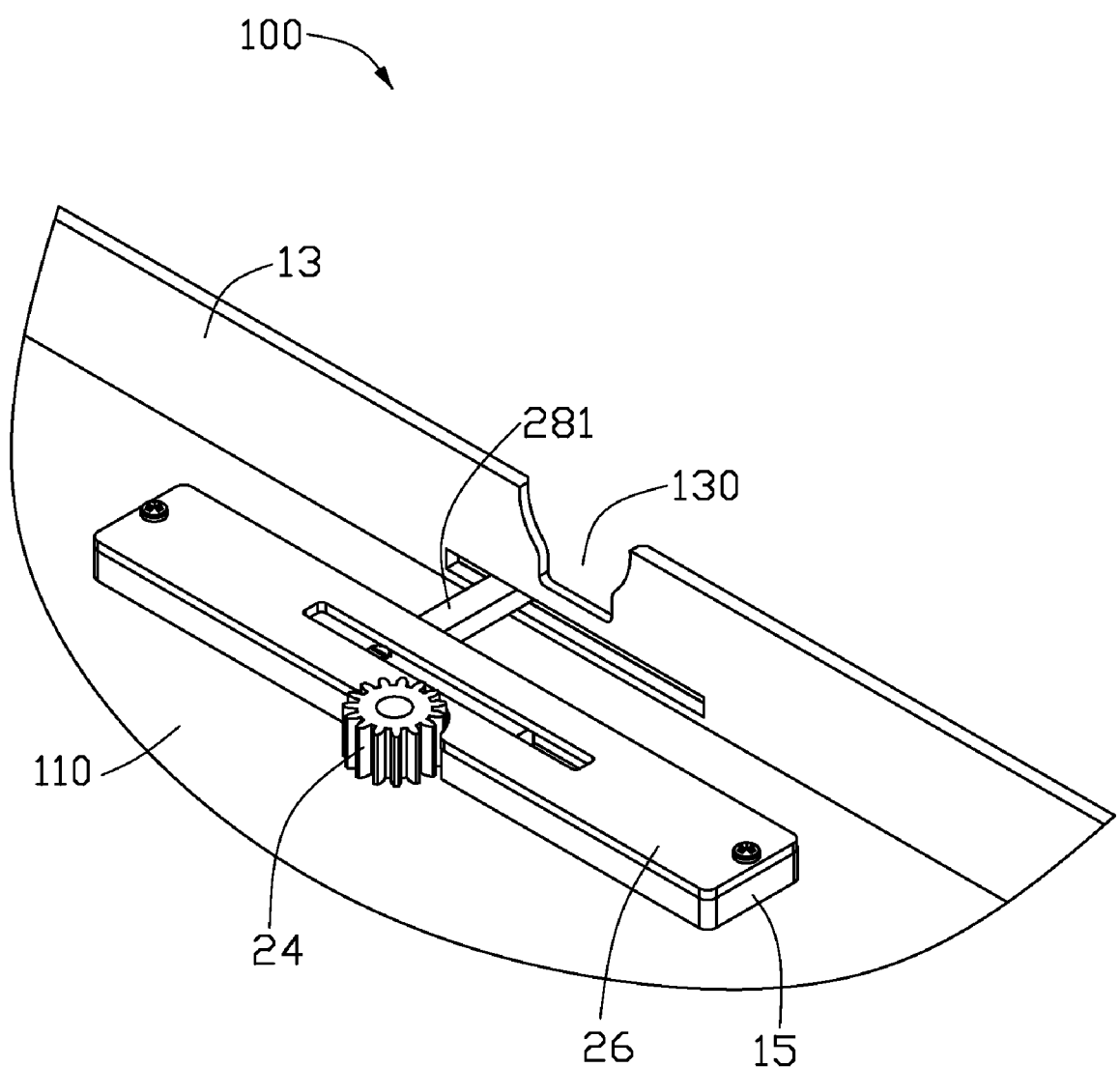
Figure 5:
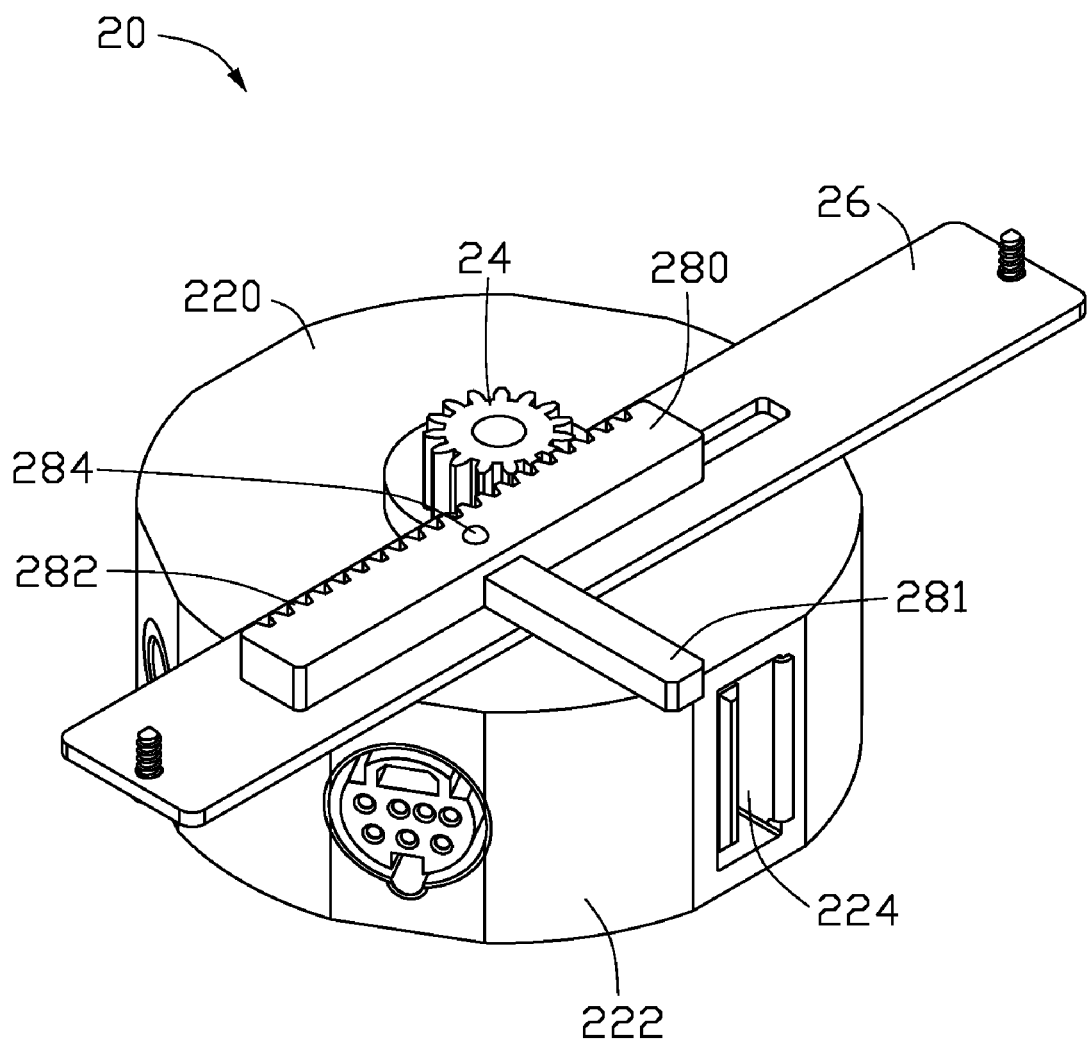
FIG. 5 is an assembled view of a connecting device of the electronic device of FIG. 1.

Also referring to FIGS. 3-5, in assembly, the driving rack 280 is slidably received in the sliding slot 150 such that the toothed edge 282 faces the receiving slot 154 and the handle 281 protrudes out of the housing 10 via the passing slot 152 and the elongated slot 132. The positioning ball 284 and the spring 285 are inserted into the through hole 283 sequentially, and then the screw 286 is engaged in the through hole 283 to seal the through hole 283. The spring 285 is compressed because it is longer than the thickness of the driving rack 280 (i.e., the depth of the through hole 283), and accordingly the positioning ball 284 is pressed by the compressed spring 285 to contact the inner surface 110. The cover plate 26 is fixed to the frame 15 by, for example, two screws (not labeled, other fixing means such as adhesive can be used too) to enclose the driving rack 280 in the frame 15. The driven gear 24 is disposed on the bottom surface 220, inserting into the cutout 260, and being rotatably positioned by the pivot shaft 17, and engaging with the toothed edge 282.

In use, the portion of the handle 281 exposed outside the housing 10 can be pushed forth or back along the elongated slot 132. The driving rack 280 is forced to slide along the sliding slot 150. Accordingly, the driven gear 24 and the main body 22 are driven by the driving rack 280 to rotate around the pivot shaft 17. When the handle 281 is pushed to pass a label 136, the positioning ball 284 falls into a corresponding positioning blind hole 112, and a corresponding connection port 224 is positioned to align with the opening 130. However, if the connection port 224 is not desired, the handle 281 is pushed again to force the positioning ball 284 to roll out of the positioning blind hole 112, further compress the spring 285 and slide on the bottom plate 11.

Figure 6:
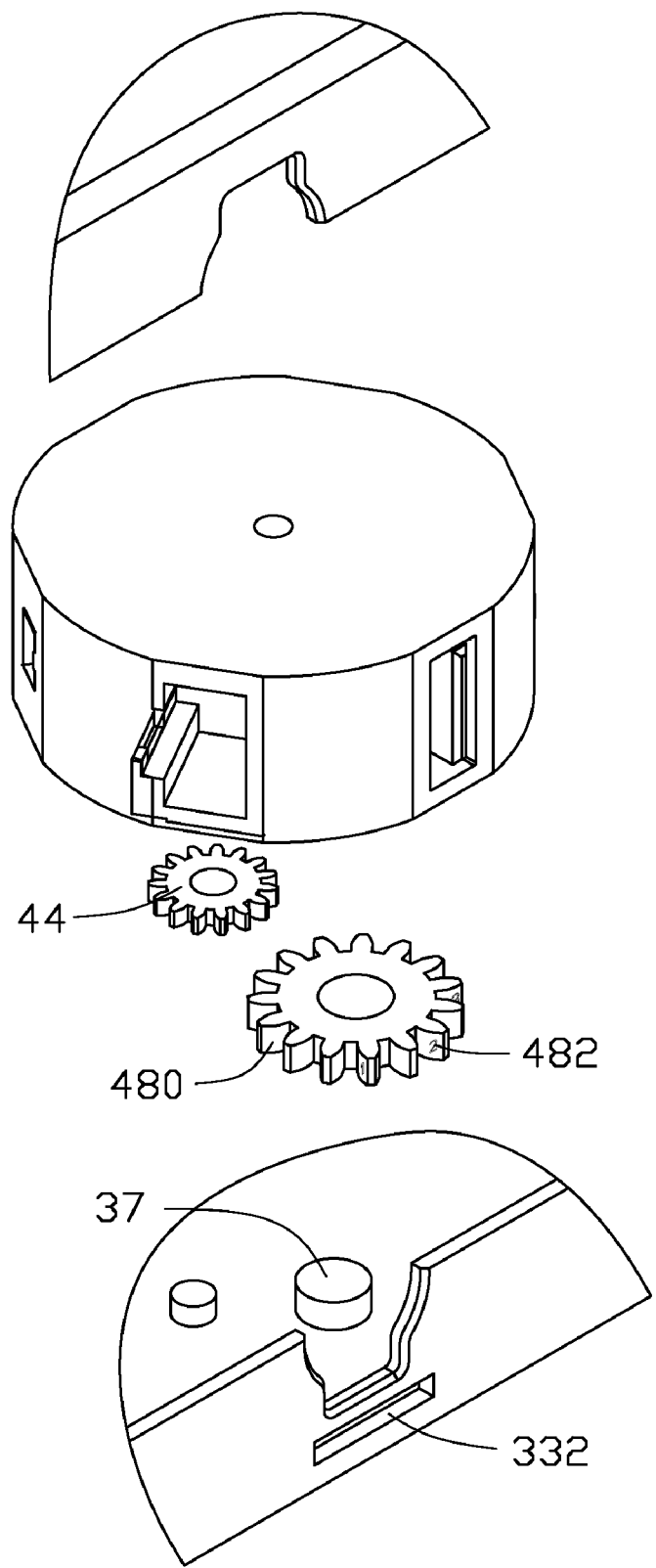
FIG. 6 is an isometric, exploded, schematic view of an electronic device according to another exemplary embodiment.
Figure 7:
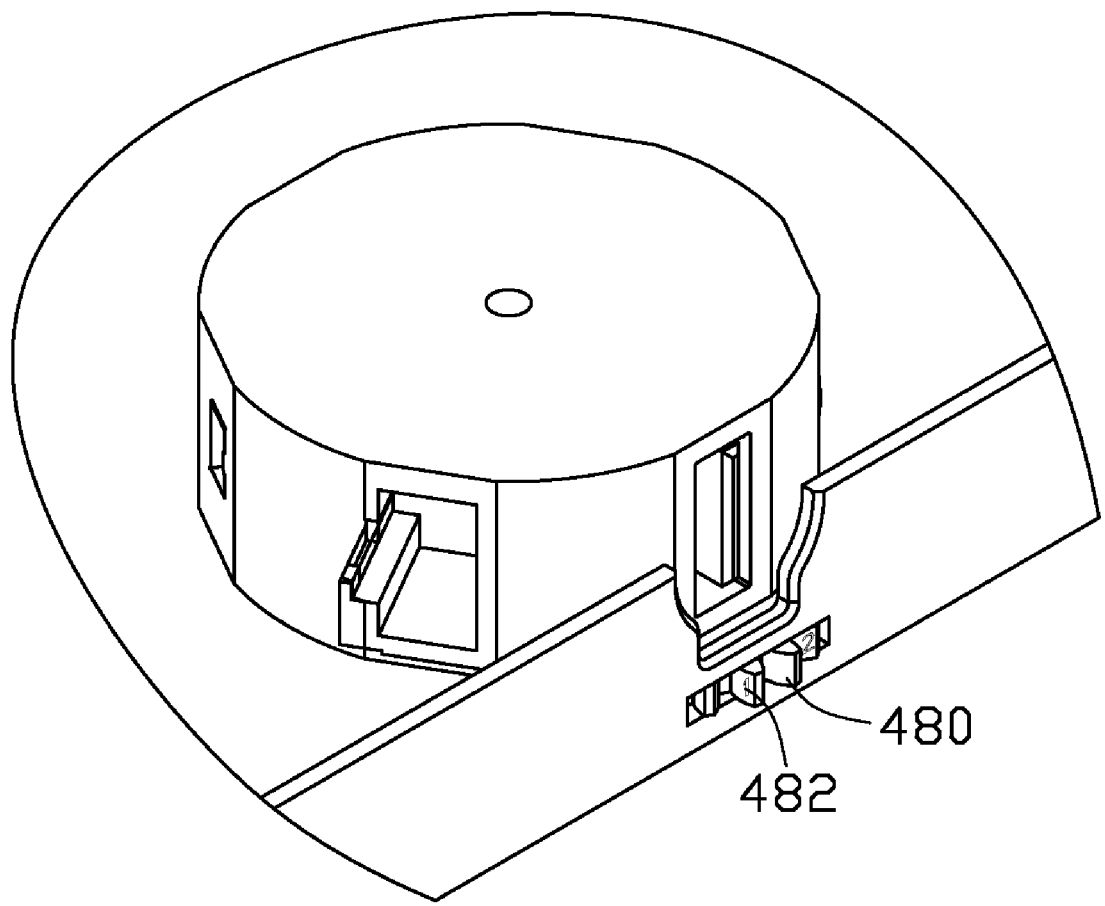
FIG. 7 is a partially assembled view of the electronic device of FIG. 6.
Figure 8:
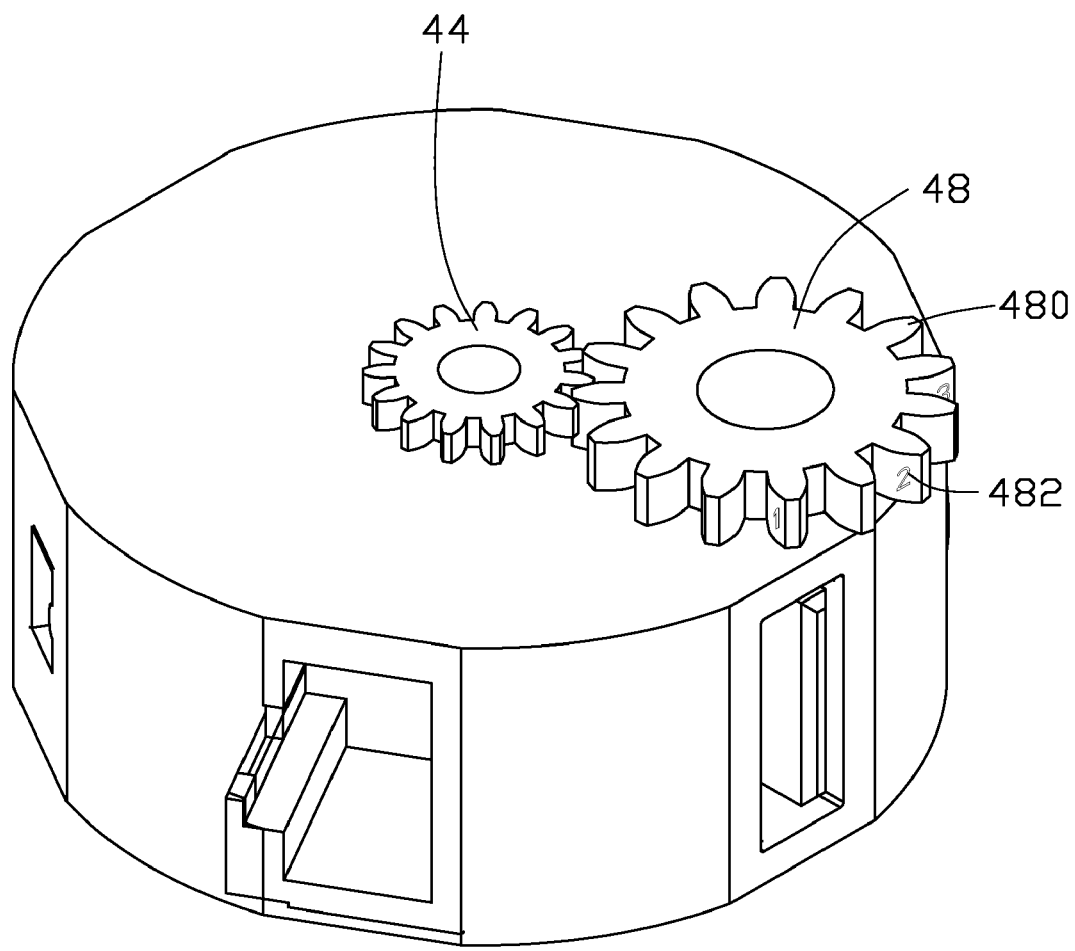
FIG. 8 is an assembled view of a connecting device of the electronic device of FIG. 6.

It should be mentioned that the driving member 28 is not limited to this embodiment. Other alternative techniques can be used too. For example, in another exemplary embodiment, the driving member 48 is a driving gear which is sleeved on a second pivot shaft 37 and engaged with the driven gear 44 as shown in FIGS. 6-8. Some gear teeth 480 of the driving member 48 extend out from the elongated slot 332. The driving member 48 defines six labels 482 on the gear teeth 480 correspondingly.

As compared with current electronic devices, a number of connection ports 224 are integrated into the connecting device 20, and only one connection port 224 is exposed at a time. Accordingly, the dustproof property of the electronic device 100 is improved.

It is to be understood, however, that even though numerous characteristics and advantages of the present embodiments have been set forth in the foregoing description, together with details of the structures and functions of the embodiments, the disclosure is illustrative only, and changes may be made in details, especially in matters of arrangement of parts within the principles of the invention to the full extent indicated by the broad general meaning of the terms in which the appended claims are expressed.

What is claimed is:

1. A connecting device for using in an electronic device, the electronic device comprising a housing, the housing comprising a bottom plate, a sidewall and a pivot shaft, the bottom plate comprising an inner surface, the sidewall extending substantially perpendicularly from the inner surface and defining an opening and a slot, the pivot shaft substantially extending perpendicularly from the inner surface and substantially aligned with the slot, the connecting device comprising:

a driven gear disposed on the inner surface and defining a central pivot hole, the pivot shaft being inserted through the central pivot hole;

a main body comprising a bottom surface and a lateral surface, the driven gear fixed to the middle of the bottom surface, the main body defining more than one connection port around the lateral surface, the radius of the main body being a little smaller than the distance between the pivot shaft and the opening; and a driving member engaged with the driven gear and protruding out from the slot, the driving member being operable to rotate the driven gear and the main body around the pivot shaft, thereby switching the connection ports to be exposed to the outside of the housing via the opening.

2. The connecting device as claimed in claim 1, wherein the driving member comprises a driving rack engaged with the driven gear, and a handle fixed to the driving rack and protruding out from the slot.

3. The connecting device as claimed in claim 1, wherein the driving member is a driving gear.

4. The connecting device as claimed in claim 3, wherein the driving member defines more than one label on gear teeth thereof, and each label corresponds to a corresponding connection port.

5. An electronic device comprising:

a housing comprising:

a bottom plate comprising an inner surface;

a sidewall extending substantially perpendicularly from the inner surface and defining an opening and a slot; and a pivot shaft substantially extending perpendicularly from the inner surface and substantially aligned with the slot; and a connecting device disposed on the bottom plate, comprising:

a driven gear disposed on the inner surface and defining a central pivot hole, the pivot shaft being inserted through the central pivot hole;

a main body comprising a bottom surface and a lateral surface, the driven gear fixed to the middle of the bottom surface, the main body defining more than one connection port around the lateral surface, the radius of the main body being a little smaller than the distance between the pivot shaft and the opening; and a driving member engaged with the driven gear and protruding out from the slot, the driving member being operable to rotate the driven gear and the main body around the pivot shaft, thereby switching the connection ports to be exposed to the outside of the housing via the opening.

6. The electronic device as claimed in claim 5, wherein the driving member comprises a driving rack engaged with the driven gear, and a handle fixed to the driving rack and protruding out from the slot.

7. The electronic device as claimed in claim 6, wherein the sidewall comprises an indicating sheet beneath the slot, and the indicating sheet defines more than one label each corresponding to a connection port.

8. The electronic device as claimed in claim 7, wherein the bottom plate defines more than one positioning blind hole each corresponding to a label, the driving rack defines a through hole therethrough and comprises a positioning ball and a compressed spring inserted into the through hole, and the positioning ball is pressed by the compressed spring to contact the inner surface to position the driving member with reference to the positioning blind holes.

9. The electronic device as claimed in claim 6, wherein the housing further comprises a frame surrounding the driving rack to limit the driving rack, and the frame defines a sliding slot to receive the driving rack, a receiving slot to receive the pivot shaft and the driven gear, and a passing slot to let the handle protrude out.

10. The electronic device as claimed in claim 9, wherein the connecting device further comprises a cover plate mounted on the frame to enclose the driving rack in the frame.

11. The electronic device as claimed in claim 5, wherein the driving member is a driving gear.

12. The electronic device as claimed in claim 11, wherein the driving member defines more than one label on gear teeth thereof, and each label corresponds to a corresponding connection port.

* * * * *